(12) United States Patent
Senior et al.

(10) Patent No.: US 12,508,366 B2
(45) Date of Patent: Dec. 30, 2025

(54) HOUSING ELEMENT AND DRUG DELIVERY DEVICE HEREWITH

(71) Applicant: Sanofi, Paris (FR)

(72) Inventors: James Alexander Senior, Warwick (GB); Harry Robert Lester, Warwick (GB); David Aubrey Plumptre, Warwick (GB); Robert Frederick Veasey, Warwick (GB); Thomas Khong, Warwick (GB)

(73) Assignee: Sanofi, Paris (FR)

( * ) Notice: Subject to any disclaimer, the term of this patent is extended or adjusted under 35 U.S.C. 154(b) by 649 days.

(21) Appl. No.: 17/923,362

(22) PCT Filed: May 14, 2021

(86) PCT No.: PCT/EP2021/062796
§ 371 (c)(1),
(2) Date: Nov. 4, 2022

(87) PCT Pub. No.: WO2021/229042
PCT Pub. Date: Nov. 18, 2021

(65) Prior Publication Data
US 2023/0191029 A1 Jun. 22, 2023

(30) Foreign Application Priority Data
May 15, 2020 (EP) .................................... 20315241

(51) Int. Cl.
*A61M 5/20* (2006.01)
*A61M 5/24* (2006.01)
*A61M 5/31* (2006.01)

(52) U.S. Cl.
CPC ................ *A61M 5/20* (2013.01); *A61M 5/24* (2013.01); *A61M 5/3135* (2013.01);
(Continued)

(58) Field of Classification Search
CPC ........ A61M 5/20; A61M 5/24; A61M 5/3135; A61M 5/3134; A61M 2005/2403;
(Continued)

(56) References Cited

U.S. PATENT DOCUMENTS

2017/0296751 A1* 10/2017 Newton .................. A61M 5/24
2018/0064877 A1 3/2018 Schneider et al.

FOREIGN PATENT DOCUMENTS

CN 102573961 A 7/2012
CN 208388701 U 1/2019
(Continued)

OTHER PUBLICATIONS

International Preliminary Report on Patentability in International Appln. No. PCT/EP2021/062796, mailed on Nov. 24, 2022, 8 pages.
(Continued)

*Primary Examiner* — Tasnim Mehjabin Ahmed
(74) *Attorney, Agent, or Firm* — Fish & Richardson P.C.

(57) ABSTRACT

The present disclosure refers to a housing element for a drug delivery device. The housing element comprises longitudinal axis and defines an interior space for receiving components of a drive mechanism of the drug delivery device and at least a portion of a cartridge of the drug delivery device. The housing element comprises an engagement feature for axially constraining the housing element to a cartridge holder of the drug delivery device. In order to constrain the cartridge in the housing element, it further comprises at least one crush web protruding radially inwards into the interior space. The at least one crush web is angled relative to the longitudinal axis of the housing element by at least 3° such that when the cartridge is introduced into the interior space the at least one crush web folds radially outwards.

20 Claims, 4 Drawing Sheets

(52) U.S. Cl.
CPC .............. *A61M 2005/2403* (2013.01); *A61M 2005/2418* (2013.01); *A61M 2005/2433* (2013.01); *A61M 2005/2477* (2013.01); *A61M 2005/2492* (2013.01); *A61M 2005/3131* (2013.01); *A61M 5/3134* (2013.01); *A61M 2205/0216* (2013.01)

(58) Field of Classification Search
CPC .. A61M 2005/2418; A61M 2005/2433; A61M 2005/2477; A61M 2005/2492; A61M 2005/3131; A61M 2205/0216
See application file for complete search history.

(56) References Cited

FOREIGN PATENT DOCUMENTS

| | | |
|---|---|---|
| GB | 1492783 A | 11/1977 |
| JP | 2007-502146 A | 2/2007 |
| JP | 2015-533321 A | 11/2015 |
| JP | 2018-509234 A | 4/2018 |
| WO | WO 1999/038554 | 8/1999 |
| WO | WO 2005/018721 | 3/2005 |
| WO | WO 2011/042539 A1 | 4/2011 |
| WO | WO 2014/072298 A1 | 5/2014 |
| WO | WO 2016/065220 | 4/2016 |
| WO | WO 2016/150898 A1 | 9/2016 |
| WO | WO 2016/156387 | 10/2016 |
| WO | WO 2016/193375 A1 | 12/2016 |
| WO | WO 2017/001693 | 1/2017 |
| WO | WO 2019/123065 A2 | 6/2019 |

OTHER PUBLICATIONS

International Search Report and Written Opinion in International Appln. No. PCT/EP2021/062796, mailed on Jun. 14, 2021, 9 pages.

* cited by examiner

HOUSING ELEMENT AND DRUG DELIVERY DEVICE HEREWITH

CROSS REFERENCE TO RELATED APPLICATIONS

The present application is the national stage entry of International Patent Application No. PCT/EP2021/062796, filed on May 14, 2021, and claims priority to Application No. EP 20315241.8, filed on May 15, 2020, the disclosures of which are incorporated herein by reference.

TECHNICAL FIELD

The present disclosure is generally directed to a housing element, e.g., an inner or outer housing component, for a drug delivery device. The present disclosure further relates to a drug delivery device, which comprises such a housing element.

BACKGROUND

Pen type drug delivery devices have application where regular injection by persons without formal medical training occurs. This may be increasingly common among patients having diabetes where self-treatment enables such patients to conduct effective management of their disease. In practice, such a drug delivery device allows a user to individually select and dispense a number of user variable doses of a medicament.

There are basically two types of drug delivery devices: resettable devices (i.e., reusable) and non-resettable (i.e., disposable). For example, disposable pen delivery devices are supplied as self-contained devices. Such self-contained devices do not have removable pre-filled cartridges. Rather, the pre-filled cartridges may not be removed and replaced from these devices without destroying the device itself. Consequently, such disposable devices need not have a resettable dose setting mechanism. The presently described housing element is generally applicable for disposable and reusable devices. However, the presently described housing element is especially applicable in pre-filled, disposable pen type devices.

Such drug delivery devices typically comprise dose setting and/or a drive mechanism to select an individual dose and to deliver this dose by displacing the piston in a cartridge containing a medicament. The cartridge, e.g., a glass ampoule, is retained in a cartridge holder or a similar type of receptacle for such a container. Prior to dose delivery, a needle is affixed to the cartridge holder, thereby piercing a septum of the cartridge. This exerts an axial force on the cartridge. However, it is important to constrain the cartridge from axial movement relative to the cartridge holder and relative to the dose setting and/or drive mechanism during the attachment of the needle and subsequent dose delivery in order to maintain good dose accuracy.

Due to the relatively large tolerances on length and diameter of the cartridge, it is known to provide some deformation of retention features in order to secure constraint of the cartridge at all tolerance extremes. For example, WO 2005/018721 A suggests that drug delivery device with crush ribs molded into the interior of a cartridge holder to hold a cartridge axially fixed between such crush ribs and an inner surface of the cartridge holder. Two other examples of deformable members engaging a cartridge neck portion to support the cartridge against movement in the axial are known from WO 2016/065220 A and WO 2016/156387 A. In addition, is known from WO 99/038554 A and WO 2017/001693 A to provide tapered ribs on an insert such that the ribs gradually reduce the inner space for receiving a proximal end of the cartridge.

These known solutions have the drawback that depending on the tolerances either the cartridge is not securely constrained in the cartridge holder or the force to assemble a cartridge is relatively high which may result in glass breakage during assembly or in case of an impact, i.e., if the device is dropped from a significant height onto a hard surface.

SUMMARY

Thus, it is an aspect of the invention to improve retaining and constraining a drug cartridge axially and radially within a drug delivery device.

One aspect of the disclosure relates to a housing element for a drug delivery device, wherein the housing element has a longitudinal axis and defines an interior space for receiving components of a drive mechanism of the drug delivery device and for receiving at least a portion of a cartridge of the drug delivery device. In general, a housing of a drug delivery device may comprise two housing elements, namely an inner body which in an exemplary embodiment may constrain and guide the drive mechanism and an outer body which in an exemplary embodiment may form the entirety of the outer surface, optionally including a cartridge holder. The two housing elements may be formed as a single part, but most likely for manufacturing reasons will be formed as two or more parts. The junction between these parts can be in a variety of locations, as determined by the needs of the device design and manufacturing considerations. In the following, the present disclosure is mainly described with respect to an example where the housing element is an inner body, i.e., a component part arranged within an outer body which is suitable to retain and/or receive other component parts of the device.

Especially, an inner body may be suitable for guiding and/or limiting movements of component parts of the drug delivery device. As an alternative, the housing element may be an outer body. The housing element preferably comprises an engagement feature for axially constraining the housing element to a cartridge holder of the drug delivery device. In other words, although the housing element, e.g., the inner body, is designed to receive a portion of the cartridge, preferably of the proximal end portion of the cartridge, the housing element is not the cartridge holder. Rather, the cartridge holder according to the present disclosure is a component part receiving and retaining at least the distal end (disensing end) of the cartridge and permitting attachment of a needle by means of at least one attachment feature provided on the cartridge holder, e.g., a threaded interface, a bayonet interface or a luer lock.

Further, the housing element comprises at least one crush web protruding radially inwards into the interior space. Preferably, the at least one crush web is angled relative to the longitudinal axis of the body by at least 3°. Preferably, this results in the at least one crush web folding radially outwards when the cartridge is introduced into the interior space. In other words, the crush web defines a plane with a substantially radial orientation with respect to the longitudinal axis, wherein the plane is inclined with respect to the longitudinal axis of the housing element by at least 3°. The at least one crush web may be angled relative to the longitudinal axis of the body by at least 5°, preferably by about 15°. The at least one crush web may be angled relative to the longitudinal axis of the body by up to 45°, preferably less than 25°. If the crush web angle to the longitudinal axis is too small/shallow then the web may buckle, rather than fold out of the way. This increases the assembly force and also risks the web fracturing into several small parts which may be visible inside the cartridge holder or may be detrimental to the operation of the pen injector mechanism.

In contrast to known tapered ribs, the radially inwards facing edge of the at least one crush web may be arranged such that the interior space defined by the at least one crush web is not gradually decreasing in the axial direction. In other words, the radially inwards facing edge of the at least one crush web is located in an, e.g., at least substantially, cylindrical plane. This includes embodiments with a chamfered inner distal end of the at least one crush web. Preferably, the radially inwards facing edge of the at least one crush web is located in a plane which is either cylindrical or conical with an inclination of less than 5° with respect to the longitudinal axis.

A housing element comprising at least one crush web as defined above is suitable to retain and constrain a drug cartridge axially and radially within the housing element, and, thus, within a drug delivery device. Especially, the at least one crush web is suitable for constraining the cartridge from axial movement relative to the housing element within a device during the attachment of a needle and subsequent dose delivery, which is essential to maintain good dose accuracy. In addition, constraining the cartridge securely also reduces the risk of cartridge cracking during an impact, such as if the device is dropped from a significant height onto a hard surface. Thus, a drug delivery device with such a housing element has an improved impact test performance with significant reduction in the instances of glass breakage when using these crush web features to retain the cartridge. Due to the relatively large tolerances on length and diameter of the cartridge, secure constraint at all tolerance extremes requires predefined deformation of the at least one crush web. The housing element with at least one crush web as defined above requires only a low axial force to assemble a cartridge, thereby significantly reducing the risk of glass breakage during assembly, while maintaining good dose accuracy by preventing cartridge movement when attaching a needle.

In one embodiment, the housing element is provided with at least one lateral aperture. Preferably, the at least one crush web is located adjacent and/or coincident with the at least one lateral aperture. This allows that the at least one crush web folds into the at least one lateral aperture when the cartridge is introduced into the interior space. Thus, excessive forces acting on the cartridge are avoided and the folding behavior of the at least one crush web is more predictable and pre-defined. The inclusion of an aperature also makes it possible to mould the crush web, which would otherwise create an 'undercut' in the tool. The aperture may be made using a seperate piece of the tool (for example a 'slide'), which forms one side of the crush web and shuts off against another piece of the tool (e.g., a core pin) that forms the other side of the web. In practice this 'shut-off' between the two tool parts also means that there is a pathway for air in the mould tool to escape from, which helps the very thin crush web to fill correctly with polymer during the moulding process.

Generally, a cartridge may be secured within the housing element using at least one crush web and an interior surface of the housing element. However, it is preferred if the housing element comprises several crush webs, e.g., three crush webs spaced approximately 120° apart, such that the cartridge is constrained within the housing element by means of only the radially inner edges of the crush webs.

Typical cartridge volumes for drug delivery devices include 3 ml and 1.5 ml cartridges. If using a small diameter cartridge (1.5 ml) mounted inside a device that is also able to accommodate a larger diameter cartridge (3 ml), the housing element may be adapted without having to adapt the whole dose setting and/or drive mechanism. For example, the housing element may be provided with at least one support structure extending radially inwards into the interior space thereby reducing the diameter for receiving a cartridge of the drug delivery device. In one embodiment, the at least one crush web is located on the at least one support structure, such that when the cartridge is introduced into the interior space the at least one crush web folds radially outwards, e.g., in a free space next to the support structure. The at least one support structure may comprise two pairs of radially inwardly protruding walls, wherein one crush web is located on each of the four walls. Further, the pairs of radially inwardly protruding walls may be spaced 180° apart. For manufacturing reasons, it may be favourable to mould two pairs of crush webs positioned 180° apart. When the crush webs are radially inside the outer wall of the housing, this is easier, e.g., if the mould tool has a maximum of two slides.

In one embodiment, the at least one crush web has a thickness of at least 0.1 mm up to about 0.3 mm, preferably about 0.15 mm or about 0.2 mm. If the crush web is too thick and radially protruding, then it does not buckle but has to be plastically yielded causing a much higher assembly force. This in turn creates much higher stresses in the glass wall of the cartridge which would risk it cracking during assembly or even post assembly during storage or use. This assembly force may vary considerably with tolerances on cartridge length and diameter, but by promoting folding behavior of the at least one crush web rather than buckling or crushing, this variation is brought within acceptable parameters that do not lead to glass breakage.

To improve the predefined folding behavior of the at least one crush web for folding radially outwards when a cartridge is inserted, the housing element may have a reduced wall thickness locally where the at least one crush web joins the housing element. Thus, the crush webs deform when a cartridge is inserted and tend to fold out of the way due to angled geometry. As the crush webs are, e.g., only 0.15 mm thick this requires a low assembly force and this assembly force does not change significantly as the cartridge is inserted further axially.

In one embodiment, the housing element comprises a distal portion having a larger diameter for receiving at least a portion of a cartridge of the drug delivery device and a proximal portion having a smaller diameter compared with the distal portion for receiving components of a drive mechanism of the drug delivery device. For example, the distal portion and the proximal portion are connected to each other by a radially extending flange wall.

In one embodiment, the housing element is an inner body for a drug delivery device configured to interact with components of a dose setting and/or drive mechanism of the drug delivery device. For example, the housing element, e.g., the proximal portion, may comprise an inner thread for engaging a threaded piston rod of the drug delivery device. In addition or as an alternative, the housing element, e.g., the proximal portion, may comprise an outer thread for engaging a dose dial sleeve (number sleeve) of the drug delivery device. In addition or as an alternative, the housing element, e.g., the proximal portion, may comprise inner axially extending splines for engaging a drive sleeve of the drug delivery device. Further, the housing element, e.g., the distal portion, comprises the engagement feature which may be a circumferentially extending bead or groove provided on an outer surface of the housing element.

The present disclosure further pertains to a drug delivery device comprising a housing element, preferably an inner body, as defined above. In one embodiment, a drug delivery device comprises the housing element, a cartridge containing a medicament, a drive mechanism for driving a piston in the cartridge and an additional housing element, like an outer body axially constrained to the housing element by the engagement feature. Optionally, the outer body encloses the housing element and the cartridge, i.e., the outer body may be extending from the distal end to the proximal end of the device such that the outer body is also the cartridge holder, e.g., with an interface for attaching a needle.

The present disclosure is especially applicable in disposable pen type devices, where cost precludes the use of metal spring elements to bias the cartridge axially towards the needle end of the cartridge holder.

In one embodiment, the cartridge has a nominal outer diameter which is, when the cartridge is introduced into the interior space of the housing element body, in radial interference with the at least one crush web.

According to a preferred example, the dimensions of the at least one crush web are adapted to the nominal outer diameter of the cartridge, that, when the cartridge is introduced into the interior space of the body, each crush web exerts a force of about 2.5 N to 5 N, preferably between 3 N and 4.5 N, after the initial engagement between the respective crush web and the cartridge, e.g., after 0.2 mm and up to 1.5 mm relative travel between the respective crush web and the cartridge. This may be achieved if the crush web(s) is angled relative to the axis of the housing by at least 3° and preferably 15° so that when the cartridge is assembled the web folds/curls into the aperture maintaining axial and radial constraint on the cartridge at all tolerance conditions. Typical tolerance conditions of the cartridge and associated device components are in the region of +/−0.6 mm in the assembly height of the proximal end face of the cartridge.

The presently described housing element is applicable for devices which are manually driven, e.g., by a user applying a force to an injection button, for devices which are driven by a spring or the like and for devices which combine these two concepts, i.e., spring assisted devices which still require a user to exert an injection force. The spring-type devices involve springs which are preloaded and springs which are loaded by the user during dose selecting. Some stored-energy devices use a combination of spring preload and additional energy provided by the user, for example during dose setting.

The drug delivery device may comprise a cartridge containing a medicament. The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N-(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

Non-limiting, exemplary embodiments of the invention will now be described with reference to the accompanying drawings, in which.

DETAILED DESCRIPTION

Figure 1:
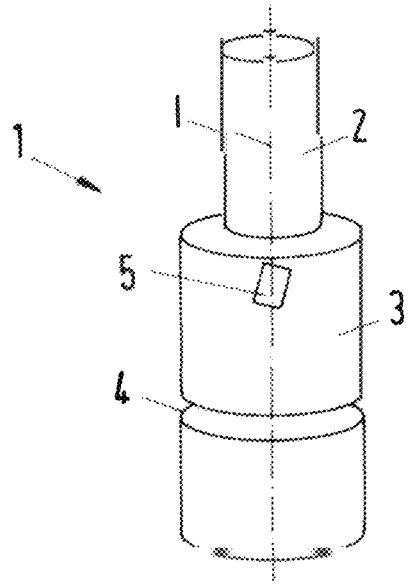
FIG. 1 shows a perspective view of a housing for a drug delivery device.

In the Figures, identical elements, identically acting elements or elements of the same kind may be provided with the same reference numerals.

The terms "axial", "radial", or "circumferential" as used herein may be used with respect to a main longitudinal axis I of the device, the cartridge, the housing or the cartridge holder, e.g., the axis which extends through the proximal and distal ends of the cartridge, the cartridge holder or the drug delivery device.

"Distal" is used herein to specify directions, ends or surfaces which are arranged or are to be arranged to face or point towards a dispensing end of the drug delivery device or components thereof and/or point away from, are to be arranged to face away from or face away from the proximal end. On the other hand, "proximal" is used to specify directions, ends or surfaces which are arranged or are to be arranged to face away from or point away from the dispensing end and/or from the distal end of the drug delivery device or components thereof. The distal end may be the end closest to the dispensing and/or furthest away from the proximal end and the proximal end may be the end furthest away from the dispensing end. A proximal surface may face away from the distal end and/or towards the proximal end. A distal surface may face towards the distal end and/or away from the proximal end. The dispensing end may be the needle end where a needle unit is or is to be mounted to the device, for example.

Figure 2:
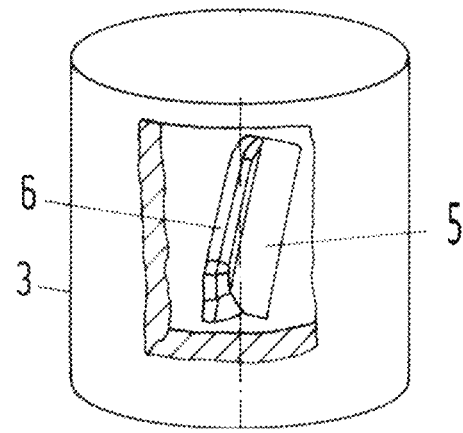
FIG. 2 shows a cut-away view on the inner side of the housing of FIG. 1.

A first housing is depicted in FIGS. 1 and 2. These figures schematically show a housing element 1 for use in a drug delivery device. The housing element 1 comprises a proximal body portion 2 having a smaller diameter and a distal body portion 3 having the larger diameter compared with the proximal body portion 2. The proximal body portion 2 and the distal body portion 3 are connected by a flange-like wall extending substantially perpendicular to the longitudinal axis I. The distal body portion 3 is provided with a circumferentially extending groove 4 which forms an engagement feature for axially constraining the housing 1 to another component part of the drug delivery device, for example for axially constraining the housing element 1 to a cartridge holder (not shown in FIGS. 1 and 2).

The housing element 1 may be an internal housing or inner body of a drug delivery device, for example an internal component part housing components of a drive mechanism and/or a dose setting mechanism of the drug delivery device. As an alternative, the housing element 1 may be an external housing or outer body of the drug delivery device, i.e., an outer shell encasing all components of the drug delivery device.

As shown in FIGS. 1 and 2, the distal body portion 3 comprises an aperture 5. In the exemplary embodiment, the aperture 5 is substantially rectangular and angles relative to the longitudinal axis I of the housing 1. However, the shape and orientation of the aperture 5 is not limited to the depicted example. In addition, the may be more than one aperture 5 as shown in FIGS. 1 and 2.

FIG. 2 shows a partially cut away view on the inner side of the distal body portion 3. A crush web 6 is provided adjacent to the aperture 5 on the inner side of the distal body portion 3. In other words, the crush web 6 extends substantially radially inwards. As can be seen in FIG. 2, the crush web 6 extends in a plane which is angled relative to the longitudinal axis I of the housing by about 15°. The radially inwards facing edge of the crush web 6 extends in a cylindrical plane which is parallel to the cylindrical distal body portion 3. In other words, the radially inwards facing edge is not tapered with respect to the distal body portion 3. Further, in the exemplary embodiment, the crush web 6 has a substantially constant thickness of about 0.15 mm. FIG. 2 shows the crush web significantly thicker for illustration purposes.

The interior space of the distal body portion 3 of the housing element 1 is intended to receive a proximal end of a cartridge (not shown) during assembly of a drug delivery device. The crush web 6 is arranged such that the nominal outer diameter of the cartridge is in a radial interference with the crush web 6. Thus, when the cartridge is assembled, the crush web 6 folds/curls into the aperture 5 maintaining axial and radial constraint on the cartridge at all tolerance conditions.

Figure 3:
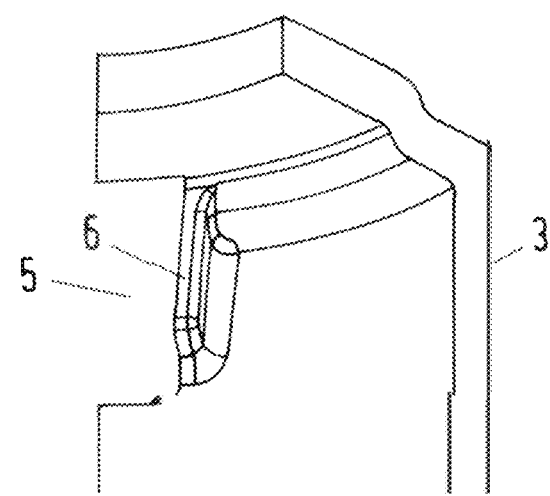
FIG. 3 shows a perspective view of a detail of a second housing for a drug delivery device.
Figure 4:
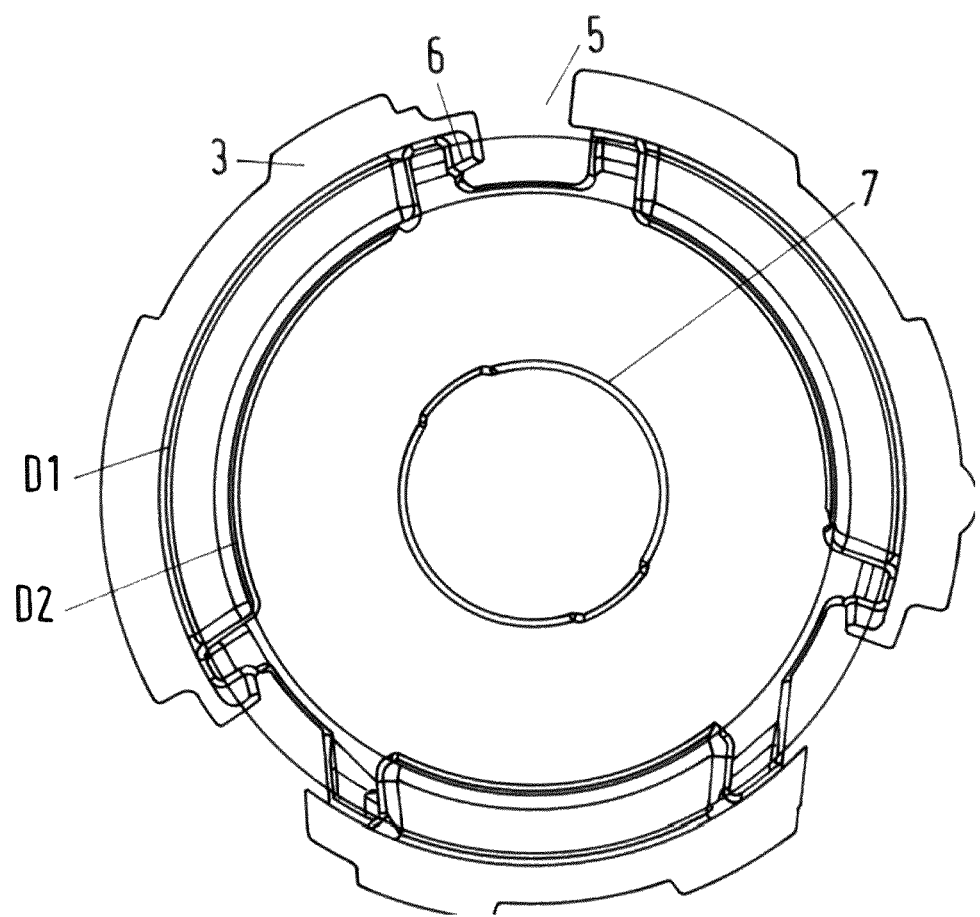
FIG. 4 shows a section through the housing of FIG. 3.
Figure 5:
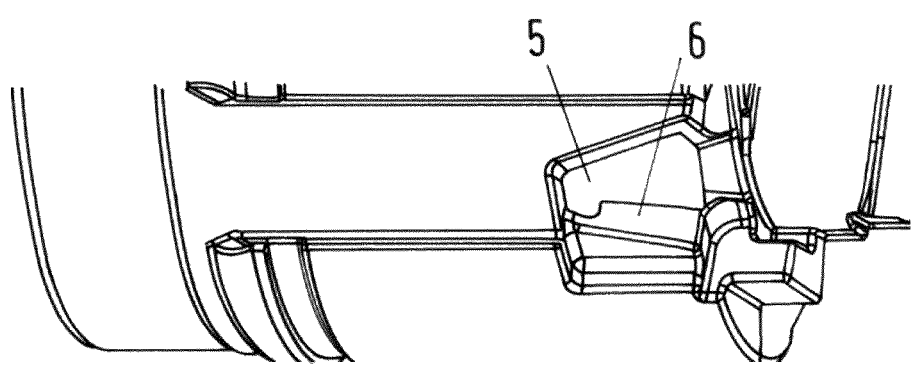
FIG. 5 shows a side view of the housing of FIG. 3.

One or more crush webs may be moulded into the housing element 1 of a device, wherein one side of a crush rib 6 is adjacent/coincident with the aperture 5 through the side wall of the housing element 1 and angled relative to the longitudinal axis I of the housing element 1 by at least 3° and preferably 15° so that when the cartridge is assembled, the web 6 folds/curls into the aperture 5, maintaining axial and radial constraint on the cartridge at all tolerance conditions. An example of such an embodiment comprising three crush webs 6 spaced 120° apart is shown in the exemplary embodiment of FIGS. 3 to 5. As can be seen for example in FIG. 4, the distal body portion 3 may have reduced wall thickness locally where the respective crush web 6 joins of the outer wall of the distal body portion 3. Further, FIG. 4 shows a threaded interface 7 provided inside the proximal body portion 2. This threaded interface may be suitable for engagement with a threaded piston rod or the like.

In FIG. 4, a cartridge is indicated by two concentrical circles D1 (outer diameter of the cartridge) and D2 (inner diameter of the cartridge). As can be seen, the crush ribs 6 are designed to be in interference with the glass of the cartridge and deform during assembly of the mechanism.

Figure 6:
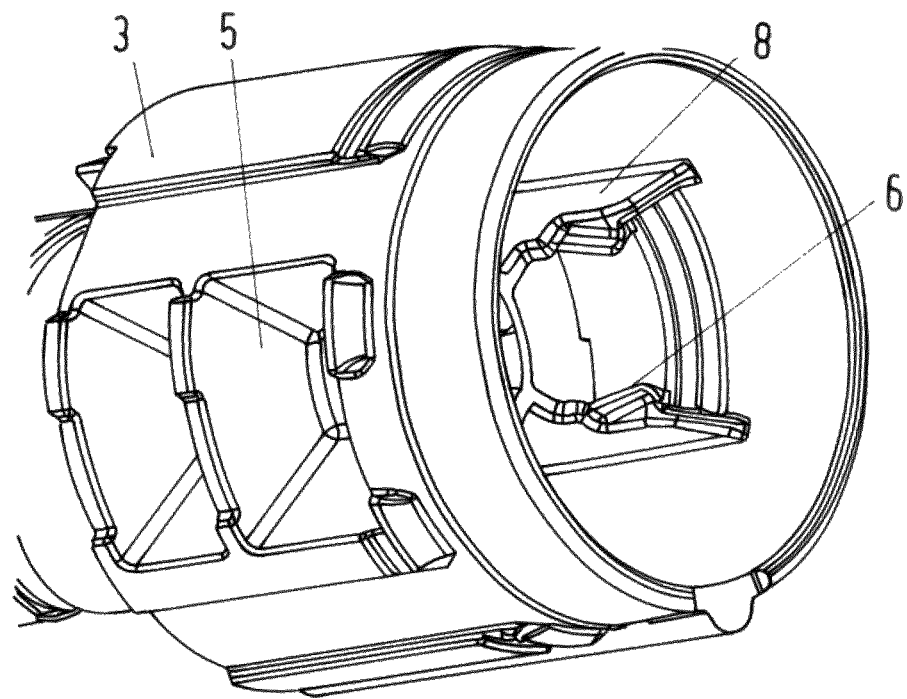
FIG. 6 shows a perspective view on a third housing for a drug delivery device.
Figure 7:
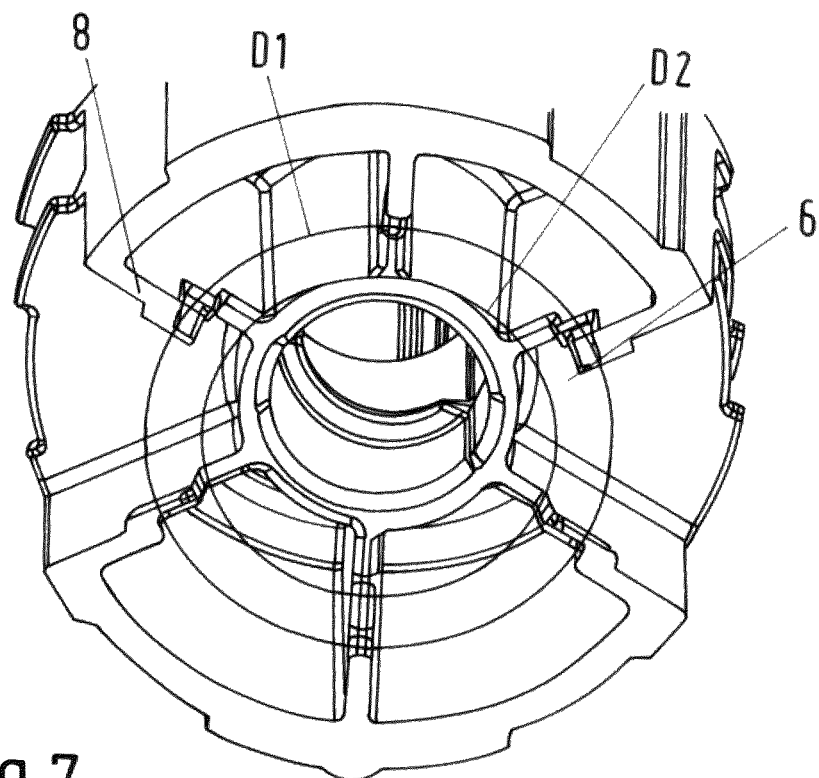
FIG. 7 shows a perspective view on the housing of FIG. 6.

While the first and second embodiments depicted in FIGS. 1 to 5 show a housing element 1 suitable for receiving a 3 ml cartridge, the at least one crush web 6 according to the present disclosure may be provided in housings for other cartridge sizes, too. An example of a housing element 1 suitable for a 1.5 ml cartridge variant is depicted in the third embodiment of FIGS. 6 and 7. While the diameter of the distal body portion 3 is identical with the diameter in the second embodiment of FIGS. 3 to 5, the outer diameter of the cartridge is substantially smaller in the third embodiment. The reduced diameter of the cartridge is indicated in FIG. 7 by the external diameter D1 and the internal diameter D2 of the cartridge.

In this third embodiment, the distal body portion 3 is provided with two pairs of radially extending support walls 8 which are positioned 180° apart. A crush web 6 is provided at the radially inwards facing edge of each of the four support walls 8. When the cartridge is inserted into the housing element 1, the crush webs 6 interfere with the outer diameter of the cartridge and fold the crush webs 6 away in the space between the inner edge of the support walls 8 and the distal body portion 3.

Figure 8:
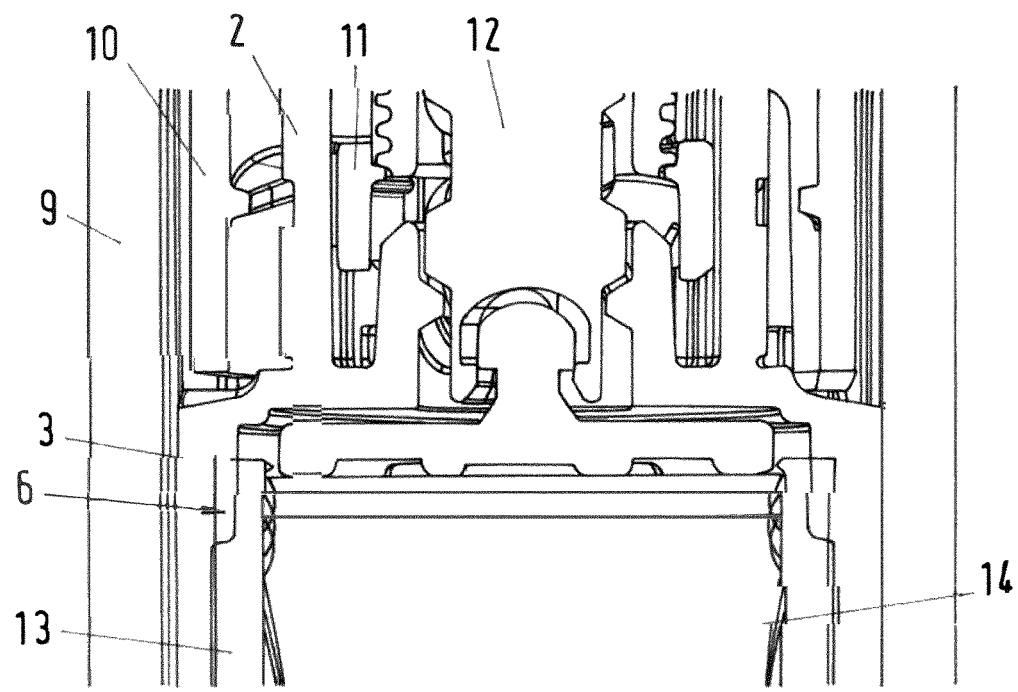
FIG. 8 shows a sectional view on a fourth housing for a drug delivery device.

FIG. 8 shows a fourth embodiment, wherein the housing element 1 is an inner body retained in an outer body or shell 9. The inner housing element 1 is axially constrained to the outer body 9 by an inwardly extending bead of the outer body 9 engaging the grooves 4 on the distal body portion 3 of the inner housing element 1. The outer body 9 extends from the distal end to the proximal end of the drug delivery device and houses not only the dose setting and drive mechanism but also functions as a cartridge holder. As an alternative, a separate cartridge holder may be provided attached to the housing element 1 and/or to the outer body 9.

The inner housing element 1 has a threaded interface on the outside of the proximal body portion 2 for engaging a dose dial sleeve or a number sleeve 10. Further, a splined interface provided on the inner side of the proximal body portion 2 engages and guides a driver 11 of the drug delivery device. Still further, a threaded piston rod 12 is guided in the threaded interface 7.

In the condition depicted in FIG. 8, a cartridge 13 with a bung or piston 14 is inserted into the device such that the proximal end of the cartridge 13 is received in the distal body portion 3 of the inner housing element 1. By inserting the cartridge 13 into the distal body portion 3, crush webs 6 are deformed, thereby constraining the cartridge 13 axially and radially within the inner housing element 1.

Figure 9:
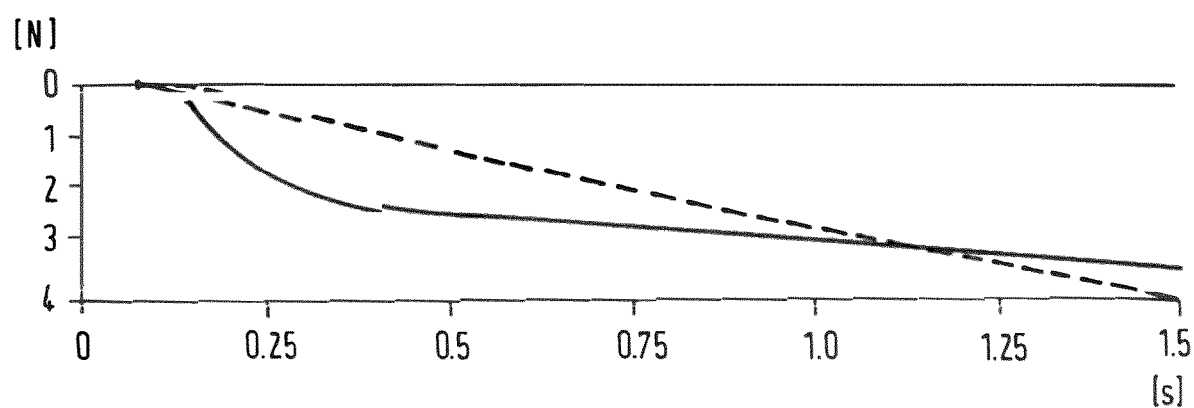
FIG. 9 shows a graph of the force exerted by a crush web depending on the axial travel of a cartridge.

FIG. 9 is a graph comparing the force exerted by a tapered prior art rib (dotted line) and of the force exerted by a crush web according to the present disclosure (continuous line) as the cartridge 13 is inserted into the housing element 1. While a tapered prior art rib results in a gradually increasing force exerted on the cartridge, a crush web according to the present disclosure exerts a substantially constant force on the cartridge. In more detail, after initial engagement of the crush web 6, at about 0.2 mm of relative travel between the cartridge 13 and the crush web 6, the force has risen to about 3 N. for the next 1.2 mm of travel it only raises to just under 4 N. This is ideal as it can accommodate tolerance of +/−0.6 mm in the assembly height of the end face of the cartridge 13 relative to the housing element 1 whilst still applying 3-4 N per crush web 6. The crush webs 6 deform when the cartridge 13 is inserted and tend to fold out of the way due to angled geometry. As the crush webs 6 are only 0.15 mm thick, this requires a low assembly force and this assembly force does not change significantly as the cartridge is inserted further axially.

The low axial force to assemble a cartridge prevents glass breakage during assembly. Further, this maintains good dose accuracy by preventing cartridge movement when attaching a needle (not shown) and shows an improved impact test performance with significant reduction in the instances of glass breakage when using these crush webs 6 to retain the cartridge 13.

REFERENCE NUMERALS 1 (inner) housing element
2 proximal body portion
3 distal body portion
4 engagement groove
5 aperture
6 crush web
7 threaded interface
8 wall
9 outer body (shell)
10 number sleeve
11 driver
12 piston rod
13 cartridge
14 piston
D1 outer diameter of the cartridge
D2 inner diameter of the cartridge
I longitudinal axis

The invention claimed is:

1. A housing element for a drug delivery device, the housing element comprising a longitudinal axis and defining an interior space for receiving components of a drive mechanism of the drug delivery device and at least a portion of a cartridge of the drug delivery device, wherein the housing element comprises an engagement feature for axially constraining the housing element to a cartridge holder of the drug delivery device, the housing element further comprising at least one crush web protruding radially inwards into the interior space, wherein the at least one crush web is angled relative to the longitudinal axis of the housing element by at least 3° such that when the cartridge is introduced into the interior space the at least one crush web folds radially outwards.

2. The housing element according to claim 1, wherein the at least one crush web is angled relative to the longitudinal axis of the housing element by at least 5°.

3. The housing element according to claim 1, wherein the at least one crush web is angled relative to the longitudinal axis of the housing element by about 15°.

4. The housing element according to claim 1, wherein the housing element comprises at least one lateral aperture, wherein the at least one crush web is located adjacent and/or coincident with the at least one lateral aperture, such that when the cartridge is introduced into the interior space the at least one crush web folds into the at least one lateral aperture.

5. The housing element according to claim 1, wherein the housing element comprises three crush webs spaced 120° apart.

6. The housing element according to claim 1, further comprising at least one support structure extending radially inwards into the interior space thereby reducing the diameter for receiving the cartridge of the drug delivery device, wherein the at least one crush web is located on the at least one support structure, such that when the cartridge is introduced into the interior space the at least one crush web folds radially outwards.

7. The housing element according to claim 6, wherein the at least one support structure comprises two pairs of radially inwardly protruding walls, wherein one crush web is located on each of the four walls.

8. The housing element according to claim 7, wherein the pairs of radially inwardly protruding walls are spaced 180° apart.

9. The housing element according to claim 1, wherein the at least one crush web has a thickness of at least 0.1 mm.

10. The housing element according to claim 1, wherein the at least one crush web has a thickness of about 0.15 mm.

11. The housing element according to claim 1, wherein the housing element has a reduced wall thickness locally where the at least one crush web joins the housing element.

12. The housing element according to claim 1, wherein the housing element comprises an inner thread for engaging a threaded piston rod of the drug delivery device.

13. The housing element according to claim 1, wherein the housing element comprises an outer thread for engaging a dose dial sleeve of the drug delivery device.

14. The housing element according to claim 1, wherein the housing element comprises inner axially extending splines for engaging a drive sleeve of the drug delivery device.

15. The housing element according claim 1, further comprising a distal body portion having a larger diameter for receiving at least a portion of the cartridge of the drug delivery device and a proximal body portion having a smaller diameter compared with the distal body portion for receiving components of the drive mechanism of the drug delivery device, wherein the distal body portion and the proximal body portion are connected to each other by a radially extending flange wall.

16. The housing element according to claim 1, wherein the engagement feature is a circumferentially extending bead or groove provided on an outer surface of the housing element.

17. A drug delivery device comprising:
a cartridge containing a medicament;
a drive mechanism for driving a piston in the cartridge;
a housing element comprising a longitudinal axis and defining an interior space for receiving components of the drive mechanism of the drug delivery device and at least a portion of the cartridge of the drug delivery device, wherein the housing element comprises an engagement feature for axially constraining the housing element to a cartridge holder of the drug delivery device, the housing element further comprising at least one crush web protruding radially inwards into the interior space, wherein the at least one crush web is angled relative to the longitudinal axis of the housing element by at least 3° such that when the cartridge is introduced into the interior space the at least one crush web folds radially outwards; and
an outer body axially constrained to the housing element by the engagement feature.

18. The drug delivery device according to claim 17, wherein the outer body encloses the housing element and the cartridge.

19. The drug delivery device according to claim 17, wherein the cartridge has a nominal outer diameter which is, when the cartridge is introduced into the interior space of the housing element, in radial interference with the at least one crush web.

20. The drug delivery device according to claim 17, wherein the housing element comprises at least one lateral aperture, wherein the at least one crush web is located adjacent and/or coincident with the at least one lateral aperture, such that when the cartridge is introduced into the interior space the at least one crush web folds into the at least one lateral aperture.

* * * * *